United States Patent [19]
Miller, Jr.

[11] 3,857,364
[45] Dec. 31, 1974

[54] ADJUSTABLE ANIMAL MAZE DEVICE

[76] Inventor: Frederick Henry Miller, Jr., 3884 Kingsberry, Nassau, N.Y. 12123

[22] Filed: Mar. 30, 1973

[21] Appl. No.: 346,315

[52] U.S. Cl. ..................................... 119/1, 119/29
[51] Int. Cl. ............................................ A01k 29/00
[58] Field of Search ..................... 119/1, 19, 17, 29

[56] References Cited
UNITED STATES PATENTS

| | | | |
|---|---|---|---|
| 311,793 | 2/1885 | Stranders | 46/19 |
| 2,725,036 | 11/1955 | Petrie | 119/17 |
| 3,260,236 | 7/1966 | Jones | 119/1 |

*Primary Examiner*—Hugh R. Chamblee

[57] ABSTRACT

A maze for studying the behavior of small animals comprises one or more modular floor units perforated to form a series of holes in a regular grid pattern therein. A plurality of upright insert posts are each provided with pegs adapted to be inserted into selected ones of the holes in the floor unit whereby a series of removable upright posts are provided therein. The insert posts are each provided with vertically extending grooves in which are received the edges of wall panels which extend across the floor unit and are held in a vertically upright position by the insert posts. A maze pattern of any desired configuration may be obtained by selecting appropriate ones of the holes in the floor unit to receive the insert posts and by inserting the wall panels into selected ones and selected sides of the insert posts. A multi-story maze may be provided by interconnecting two or more floor units on different levels and a multiple unit maze may be constructed by interconnecting two or more floor units on the same level.

13 Claims, 7 Drawing Figures

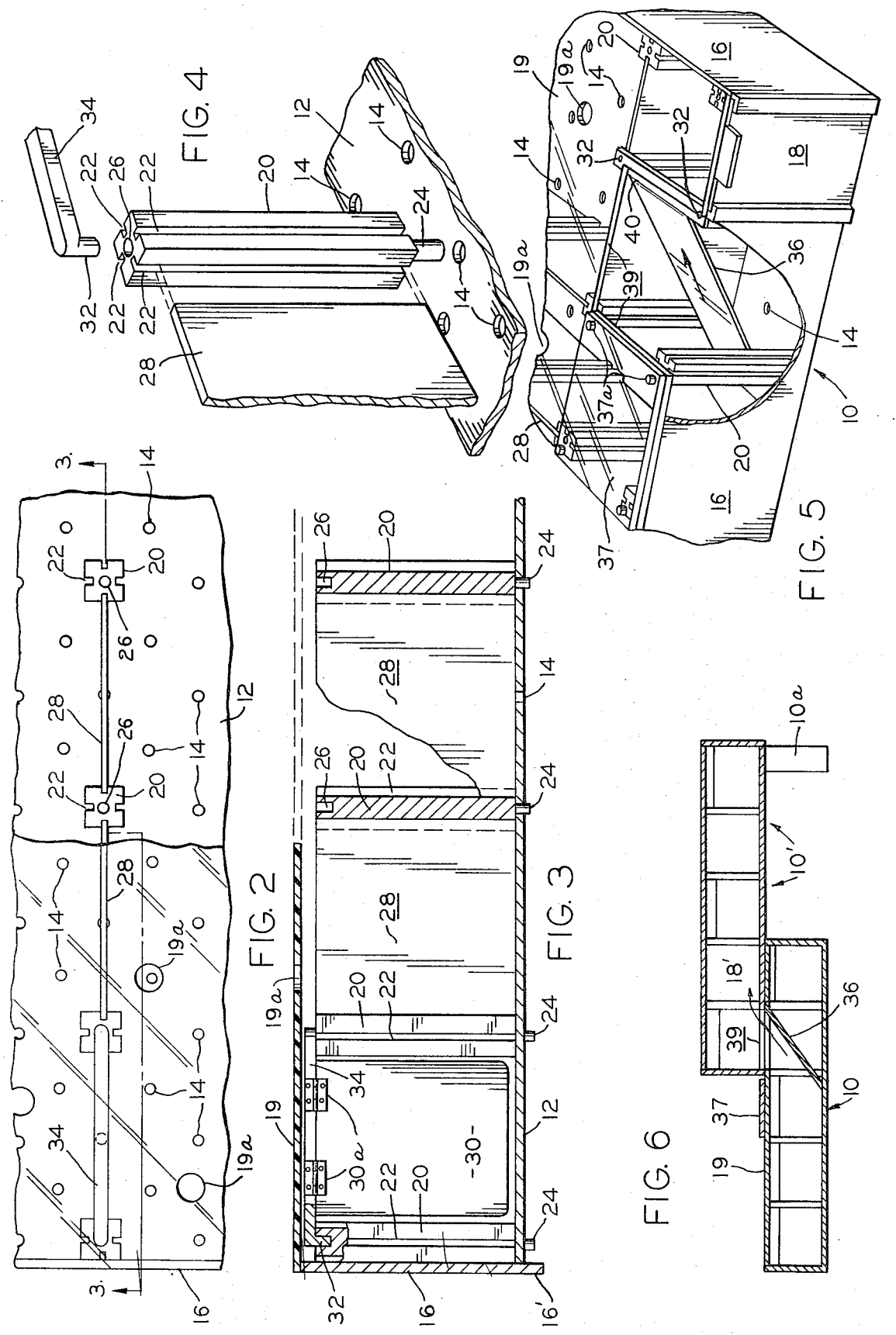

ADJUSTABLE ANIMAL MAZE DEVICE

The present invention concerns a modular animal maze device employed for studying the behavior of small animals. The present invention is more particularly concerned with a small animal maze device in which the maze pattern is capable of readily being assembled and disassembled.

Maze devices for the study of the behavior of animals, particularly small animals such as mice, hamsters and gerbils are of course well known. Animals selected for the experiment are placed in the maze and a study is made of their behavior in making their way through the maze by making a choice among the alternative pathways afforded to them, and in some cases, being subjected to stimuli, rewards or punishments for making or failing to make certain choices. Such study is extremely useful in behavioral psychology and is also popular as an educational hobby.

Different maze patterns are required for different experiments, and it is often necessary to disassemble a maze device for thorough cleaning to remove the odors of previously tested animals since such odors may influence the behavior of subsequently tested animals. Therefore, it is known to construct such mazes in a way in which they may be disassembled and reassembled both for cleaning purposes and for the purpose of changing the maze pattern.

However, such prior art maze devices have numerous shortcomings. One prior art device (U.S. Pat. No. 3,516,389) comprises floor units provided with a series of horizontal, longitudinally extending grooves therein into which grooves upright wall panels are force-fitted to provide the maze pattern. This type of arrangement necessarily requires that the maze pattern must correspond to the existing pattern of grooves in the floor unit. Further, since the existence of empty grooves, i.e., ones not containing wall panels inserted therein, often cut across the pathway to be travelled by the animal being tested, the very existence of the grooves provides a factor which may influence the behavior of the tested animal and thus affect the reliability of the test data derived. For this reason grooved floor units may have to be provided in small, custom made sections particularly where it is desired to have one passageway divert at an angle from another passageway. Custom manufacture of small, often irregular-shaped floor units is expensive and limits the flexibility of the device in providing a variety of maze patterns.

Another prior art device has a floor with slots cut therein to receive tabs formed on the bottom of preformed maze sections. This type of arrangement requires custom manufacture of separate components for each desired maze pattern. U.S. Pat No. 3,260,236 shows one such device.

It is accordingly an object of the present invention to provide a novel maze device for animal testing mazes in which the pieces are of uniform and standardized construction and yet provide virtually unlimited flexibility in selecting and changing maze patterns and in assembling and disassembling the device for cleaning, change of pattern or any other purpose.

It is another object of the present invention to provide a novel and simple animal maze structure which is capable of being joined with other like standardized units to form a multiple unit, single level maze, a multi-level maze or a multiple unit, multi-level maze.

Other objects and advantages of the invention will become apparent from the following disclosure.

In accordance with the invention there is provided an animal maze device comprising standardized floor units containing a series of holes distributed therein in a grid pattern, and wall support means selectively insertable into and removable from selected ones of the holes in said floor unit to support wall panels in a position substantially perpendicular to the floor units whereby a selected maze pattern is formed by said walls.

In accordance with one aspect of the invention said wall support means comprise posts having pegs adapted to be forcefitted into selected ones of the holes in the floor units and further having grooves extending longitudinally along their length which grooves are of a width sufficient to receive and hold the edges of wall panels which are slidably inserted therein.

In accordance with another aspect of the invention the support posts may be provided with apertures to engagably receive accessory devices such as doors and stimulus devices to be positioned in the maze pathway.

In accordance with another aspect of the invention support posts may be permanently affixed to maze periphery walls which are employed to enclose the maze structure more or less permanently while the interior maze walls are rearranged as often as needed.

In accordance with yet another aspect of the invention, another maze may be positioned above the first with access thereto by the tested animals being provided by a ramp leading from the first maze to the second, to form a multi-level maze.

Understanding of the present invention will be enhanced by consideration of the following detailed description of a specific preferred embodiment thereof and the accompanying drawings wherein FIG. 1 is a perspective schematic view of a small animal maze in accordance with the present invention;

FIG. 2 is a plan view of a portion of the maze shown in FIG. 1;

FIG. 3 is a sectional view in elevation taken along line 3—3 of FIG. 2;

FIG. 4 is an exploded, partial view of a portion of the maze of FIG. 1 showing the assembly relationship of the posts, floor unit, wall panel and an accessory employed in the maze of FIG. 1;

FIG. 5 is a partial perspective view showing a small animal maze provided with a ramp and cover access door and adapted to serve as a lower level unit in a multi-level maze;

FIG. 6 is a schematic view in elevation of a multi-level maze; and

Figure 1:
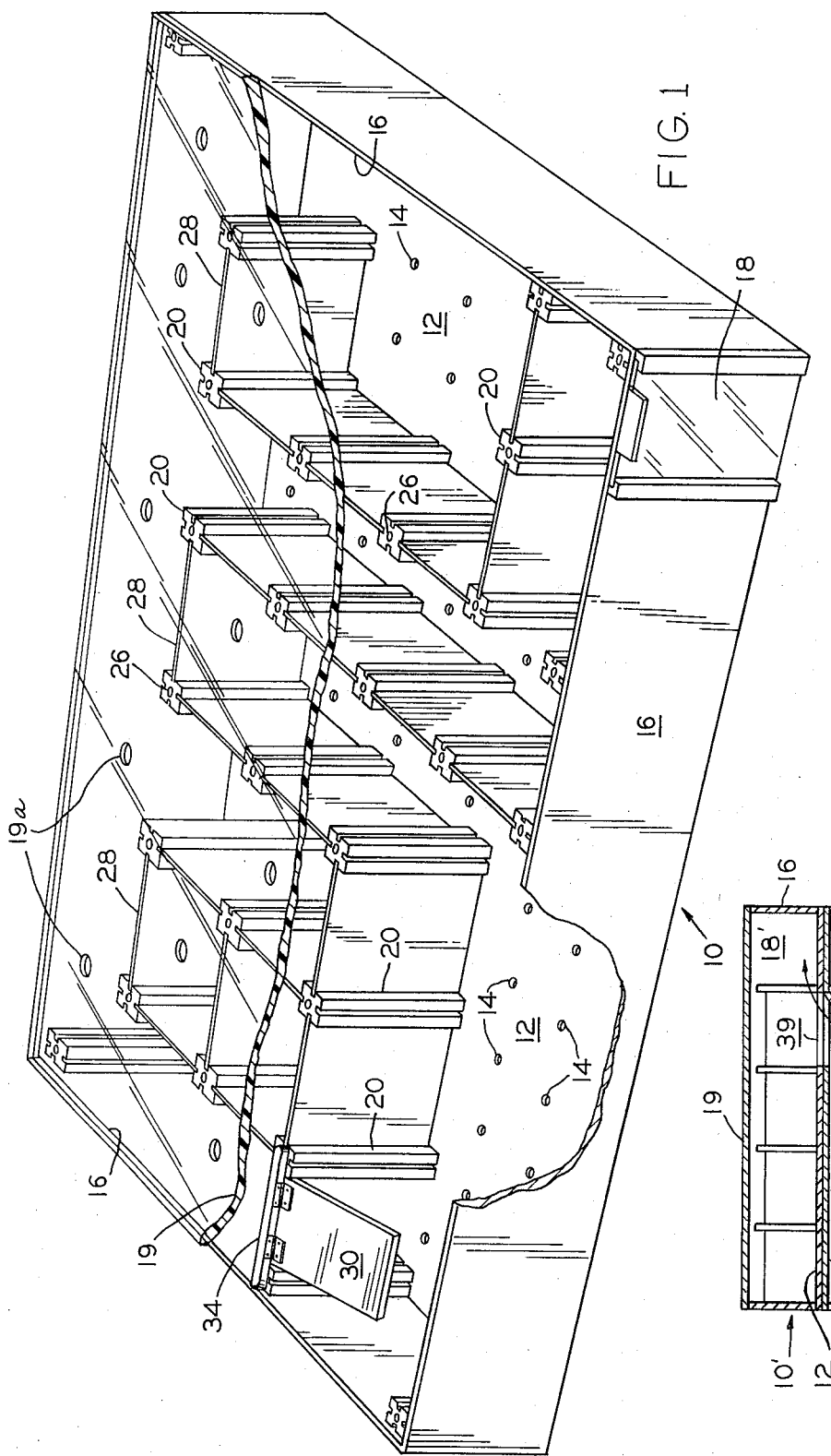

Referring now to FIG. 1, an animal maze is shown generally at 10 and comprises a floor unit 12 which has a series of holes 14 formed therein in a more or less regular grid-like pattern. Preferably, holes 14 are distributed in a regular, grid-like pattern. The periphery of floor unit 12 is enclosed by a peripheral wall 16. Closeable access means for the test animal is provided by an entrance door 18 formed in peripheral wall 16.

A series of wall support means comprising posts 20 are inserted into selected ones of the holes 14 in floor unit 12 to provide a selected maze pattern as described hereinbelow.

Referring to FIGS. 3 and 4, post 20 is shown as comprising an elongated member generally square in cross-section and provided with a series of longitudinally extending grooves 22 which are substantially co-extensive with the main body portion of post 20. At its lower end, a peg 24 extends from post 20. At its upper-most end, post 20 has a pin well 26 formed therein.

As best seen with respect to FIGS. 2 and 3, posts 20 are inserted into floor unit 12 by means of pegs 24 being inserted into holes 14 in floor unit 12. Floor unit 12 is sufficiently thick and the relationship in size between pegs 24 and holes 14 is such that a tight but readily made fit between pegs 24 and holes 14 is obtained. Floor unit 12 may conveniently be made of conventional perforated board construction, such as that sold under the trademark Pegboard. Obviously, any other method of providing a tight, readily made and readily removable fit between the upright wall support means and the perforated board may be employed. The use of spring-clips, of threaded or perforated pegs 24 and corresponding threaded holes 14, or threaded nuts or cotter pins to be employed on the underside or floor 12, are possible alternative forms of construction. However, for simplicity of construction and rapid assembly and disassembly, a simple force-fit peg and hole construction is preferred. Generally, any arrangement which permits the wall support means to be removably engagable with the holes in the floor unit is satisfactory. By the expression "removably engagable" used in the specification and in the claims, it is meant that the two pieces so described may be interlocked by sliding or otherwise placing the two pieces into engagement one with the other, and they may be released one from the other by sliding or otherwise withdrawing the two pieces from their interlocking engagement.

Wall panels 28 comprise thin, flat members of generally rectangular or square shape and are selected to be of a thickness which permits the engagement of the edges of wall panels 28 into the grooves 22 formed in posts 20.

As best seen with respect to FIGS. 1 and 4, the placing of posts 20 in selected ones of holes 14, followed by the insertion of wall panels 28 may be utilized to provide a simple, satisfactory interior wall or maze construction which provides pathways for a test animal to travel and which may be quickly and easily assembled and disassembled to change the maze pattern or for any other purpose such as cleaning. The wall panels 28 and various accessories held in place by the wall support means, the latter comprising, in this case, a series of posts 20, together cooperate to form a "maze structure" from a series of discrete wall panels 28, each individual wall panel and its associated wall support means defining a straight line segment of the maze structure. The term "maze structure", as used in this specification and in the claims, generally means any structure on floor unit 12 which serves to restrain the travel of or to stimulate the animal to be tested by providing pathways along which the animal may travel. The maze structure may also include any of various stimuli, barriers, etc.

Referring particularly to FIG. 4, pegs 24 are seen to extend longitudinally from posts 20, by which is meant that pegs 24 extend on a line which is substantially parallel to the longitudinal axis of posts 20. Pin wells 26 are formed substantially along a segment of the longitudinal axis of posts 20, starting at the upper ends of posts 20.

Posts 20 may be of any cross-sectional configuration, round, oval, rectangular (a square cross-section being considered a special case of and being included in the definition of rectangular) or polygonal. A number of longitudinally extending grooves are disposed around the periphery of the posts and, in the case of a rectangular or other polygonal structure, it is generally preferred to have one groove per face of the polygonal or rectangular structure.

Peripheral wall 16 may be supported on posts 20 identical to those employed for the interior, maze pattern walls. Peripheral walls 16 may be either permanently or removably affixed to its associated posts 20 by any suitable fastening means (not shown).

As shown in FIG. 2, the lower portion 16' of peripheral wall 16 may extend somewhat below floor unit 12 to provide clearance above the surface upon which the maze device rests for the insertion and penetration of pegs 24.

At selected locations in the maze an accessory device such as a door 30 may be suspended between selected ones of posts 20. Wells 26 may serve, as best shown in FIG. 3, to receive mounting pegs 32 of an accessory item support 34. Door 30 is mounted by hinges 30a to accessory item support 34.

Obviously, in lieu of, or in addition to mounting pegs 32, an accesory item or its support could be provided with an edge corresponding to the edge of wall panels 28, and be received in grooves 22 for mounting. Equally obviously, other mounting methods for accessories may be employed. For example, instead of the pin wells 26 illustrated, notches may be provided in the tops of posts 20. By the use of notches, an accessory such as door 30 may comprise a solid or one-piece door and rod combination. The rod would fit into notches at the top of posts 20 and rotate in the notches when the door is swung to open or close it.

It will be apparent from considering FIG. 1 that although the interior maze walls shown therein are all substantially parallel to a peripheral wall of the maze, by simply rotating selected ones of the posts 20 so that its edges are not parallel to the peripheral walls 16, an interior wall partition may be arranged at any desired angle to peripheral walls 16.

A clear plastic or glass cover 19, provided with suitable air holes 19a is placed over the wall maze structure to prevent the tested animals from climbing over the peripheral walls or the interior maze walls. Cover 19 is supported around its periphery by the top edge of peripheral wall 16. If intermediate support is needed for cover 19 it may be provided by the tops of posts 20, selected ones of which can be provided, if necessary, with extension caps (not shown) inserted into pin wells 26, for the purpose.

In use, the animal to be tested is permitted to enter via entrance door 18 which provides a closeable access means from whence it may find its way through the maze and be subjected to selected test stimuli or obstacles as may be desired by the operator.

Referring now to FIG. 5, there is shown an embodiment of the invention wherein a ramp 36 is provided to permit the tested animal to travel from one maze to another maze at a higher level than the first maze. Access ramp 36 is positioned at the exit from the lower level maze and is secured in place as is any other accessory by pins 32 which fit through holes provided on the lip 40 of ramp 36 and into pin wells 26 of posts 20. A closeable opening 39 is provided in clear cover 19 to accommodate ramp 36 and to permit access by the test animal from one level to the other. Opening 39 may be closed when not in use by clear cover 37, which also may be secured in place by pins inserted through holes 37a and into wells 26.

By climbing up the ramp 36 in the direction shown by the arrow in FIGS. 5 and 6, the tested animal gains access to a second, higher level maze 10' (FIG. 6), the entry to which is positioned at the top of ramp 36, and indicated by the numeral 18' in FIG. 6. Maze 10' is supported at one end by a support 10a.

Figure 7:
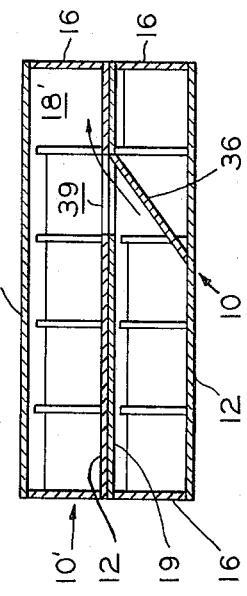
FIG. 7 is a schematic view in elevation of another multi-level maze.

FIG. 7 shows another multi-level maze arrangement, with one level directly atop the other. With either type of arrangement, as with a single level maze or three or more level maze, additional units may be added to any level to enlarge the maze. This is accomplished by simply removing one or more of periphery walls 16 to join two or more units at the same level to form a multi unit maze at that level. Naturally, periphery wall 16 is replaced around the periphery of the enlarged, multi unit level.

Two or more floor units 12 may also be interconnected at the same level, each enclosed by a peripheral wall about the separate floor units, by interconnection by means of tunnels running from one entrance door 18 to another.

In general, removing one or more peripheral walls 16 of a smaller maze and combining a second or any additional number of floor units 12 will form a larger, enclosed test maze. As used in the claims, the term "floor unit" includes a unitary floor unit as well as a floor made up of two or more discrete floor units.

While the invention has been described in detail in connection with a preferred embodiment thereof, it will become apparent that many alterations to the embodiment shown may be made, which alterations nonetheless fall within the spirit and scope of the present invention. For example, it is not necessary to provide posts 20 as items independent from wall panels 28, although this construction is preferred for maximum flexibility and rigidity of the wall structure. As an alternative form of construction, wall panels 28 could have pegs or other insert means formed integrally at the bottom thereof, and be provided with suitable lugs or connecting clamps at or near their upper ends whereby the wall panels can be inserted into the holes 14 and interconnected at or near their top-most portions to provide a rigid wall structure. As another alternative, a post 20 and a wall 28 could be joined into a unitary structure to form a unit of the interior maze wall. It will further be apparent that holes 14 and corresponding pegs 24 need not necessarily be of circular cross-section, although this is preferred for ease of construction and utilization of standard round hole perforated board for floor units 12. The round cross-section of pegs 24 and holes 14 also provides for a maximum flexibility in positioning posts 20 and therefore wall panels 28 at any angle relative to the periphery of floor unit 12. It is intended to include all such modifications and alterations within the scope of the appended claims.

What is claimed is:

1. An animal maze device comprises a floor unit having a plurality of holes therein,
   means to form a maze structure of selected pattern on said floor unit to provide pathways thereon,
   maze periphery walls structurally engageable with said floor unit to encircle said maze structure,
   said means to form a maze structure including a plurality of discrete wall panels and wall panel support means, said panels being structurally engageable with said panel support means,
   said panel support means being removably engageable with selected ones of the holes in said floor unit, whereby upon such engagement of said support means with selected ones of said holes, and upon such structural engagement of said wall panels with hole-engaged support means, said wall panels cooperate one with the other and with said panel support means to form said maze structure upon said floor unit,
   apertures provided at the upper ends of said wall panel support means to removably receive and support an accessory support means whereby a movable obstruction may be positioned by said posts within a pathway, and
   closeable access means to provide access for a small animal into said maze structure.

2. The maze of claim 1 wherein said wall panel support means comprises a post having a peg extending longitudinally from an end thereof, and having at least one longitudinally extending groove formed in a surface of said post.

3. The maze of claim 2 wherein said pegs are sized to force-fit into said holes in said floor unit, said peripheral wall is supported on said floor unit by selected wall panel support posts positioned adjacent thereto, and said closeable access means is located in said peripheral wall.

4. The maze of claim 2 wherein each individual wall panel and its associated wall support means defines a straight line segment of the maze structure.

5. The maze of claim 2 wherein said post is rectangular in cross-section and a longitudinally extending groove is contained in each of the four rectangular faces of said post.

6. The maze of claim 2 further including a cover enclosing said maze structure.

7. The maze of claim 2 wherein said apertures are located in said posts at ends opposite the ends from which said pegs extend longitudinally from said posts.

8. The maze of claim 1 further including a ramp leading therefrom to an exit positioned above the level of said floor unit.

9. The maze of claim 8 wherein said exit leads to a second animal maze positioned at a level above said first maze.

10. The maze of claim 1 wherein said floor unit is enclosed by a peripheral wall.

11. The maze of claim 1 wherein the holes in said floor unit are distributed in a regular pattern.

12. An animal maze device and means to assemble selected maze structures to form pathways thereon, comprising,
    a floor unit having a plurality of holes formed therein,
    a plurality of posts having pegs extending longitudinally from one end thereof, said pegs being removably engageable with holes in said floor unit, and said posts further having a plurality of grooves extending longitudinally along said posts,
    wells provided at the upper ends of said posts to removably receive and support an accessory support means, whereby a movable obstruction may be positioned between said posts within a maze pathway, closeable access means to provide access for a small animal into said maze structure, a plurality of discrete wall panels, edges of which are removably engageable with said grooves of said posts so that upon engagement of said wall panels with said posts, each panel and its associated posts define a straight line segment of said maze structure, and a peripheral wall on said floor unit, said peripheral wall encircling said maze structure.

13. The animal maze of claim 12 wherein said maze structure is enclosed by a peripheral wall.

* * * * *